United States Patent [19]
Barickman et al.

[11] Patent Number: 5,725,430
[45] Date of Patent: Mar. 10, 1998

[54] FAIL-SAFE SHEAR ELASTOMERIC COUPLING

[75] Inventors: James R. Barickman; Thomas A. David, both of Erie, Pa.

[73] Assignee: Lord Corporation, Cary, N.C.

[21] Appl. No.: 723,334

[22] Filed: Sep. 30, 1996

[51] Int. Cl.⁶ .................................................. F16D 3/76
[52] U.S. Cl. ................................................ 464/89; 464/160
[58] Field of Search .................... 464/160, 89, 30, 464/90

[56] References Cited

U.S. PATENT DOCUMENTS

| | | | |
|---|---|---|---|
| 1,646,427 | 10/1927 | Skidmore, Jr. | |
| 2,270,140 | 1/1942 | Piron | 64/13 |
| 2,620,163 | 12/1952 | Stone | 464/89 X |
| 2,989,857 | 6/1961 | Helland et al. | 64/11 |
| 3,045,763 | 7/1962 | Perrott | 170/160.54 |
| 3,112,625 | 12/1963 | Leto | 64/8 |
| 3,727,431 | 4/1973 | Yokel | 64/27 |
| 4,229,951 | 10/1980 | Jedlicka | 64/14 |
| 4,380,442 | 4/1983 | Amsel | 464/93 |
| 4,548,591 | 10/1985 | Haldric et al. | 464/89 |
| 4,551,115 | 11/1985 | Ferguson | 464/83 |
| 4,560,364 | 12/1985 | Cohen | 464/30 |
| 4,667,530 | 5/1987 | Mettler et al. | 464/89 X |
| 4,852,424 | 8/1989 | Grassmuck et al. | 74/574 |
| 4,891,034 | 1/1990 | Wilhelmsen | 464/87 |
| 5,086,661 | 2/1992 | Hancock | 464/89 X |
| 5,169,357 | 12/1992 | Graton | 464/68 |
| 5,213,544 | 5/1993 | Wolf et al. | 464/85 |
| 5,352,157 | 10/1994 | Ochs et al. | 464/89 |
| 5,374,219 | 12/1994 | Kohara et al. | 464/111 |
| 5,460,574 | 10/1995 | Hobaugh | 464/89 X |
| 5,474,499 | 12/1995 | Olson | 464/83 |

*Primary Examiner*—Daniel P. Stodola
*Assistant Examiner*—Emmanuel M. Marcelo
*Attorney, Agent, or Firm*—Randall S. Wayland; James W. Wright

[57] ABSTRACT

A drive coupling is fail-safed by providing an inner metallic member with a pair of machined opposing flat surfaces that can engage a pair of pins that are positioned in pockets in the intermediate elastomeric member. These pins are anchored in place with respect to the outer housing by staking the ends of the pins, or the like.

11 Claims, 2 Drawing Sheets

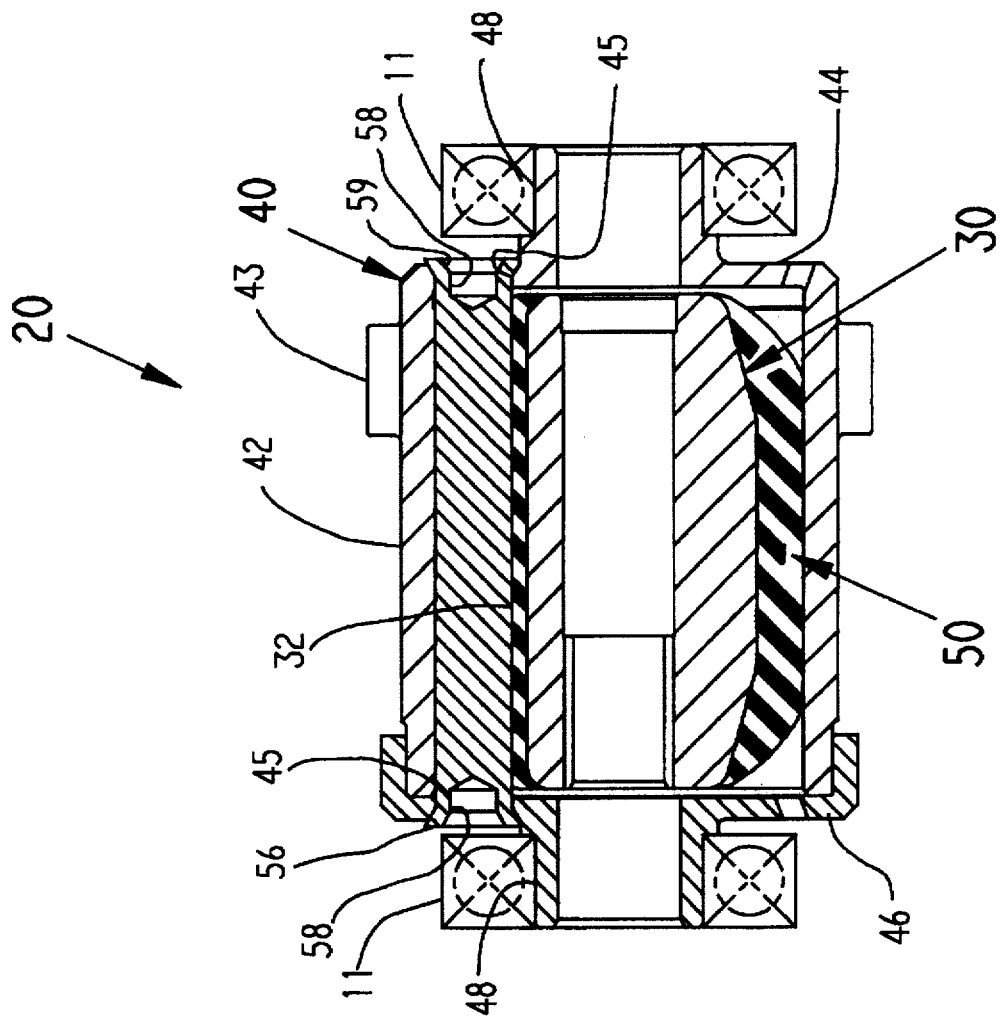
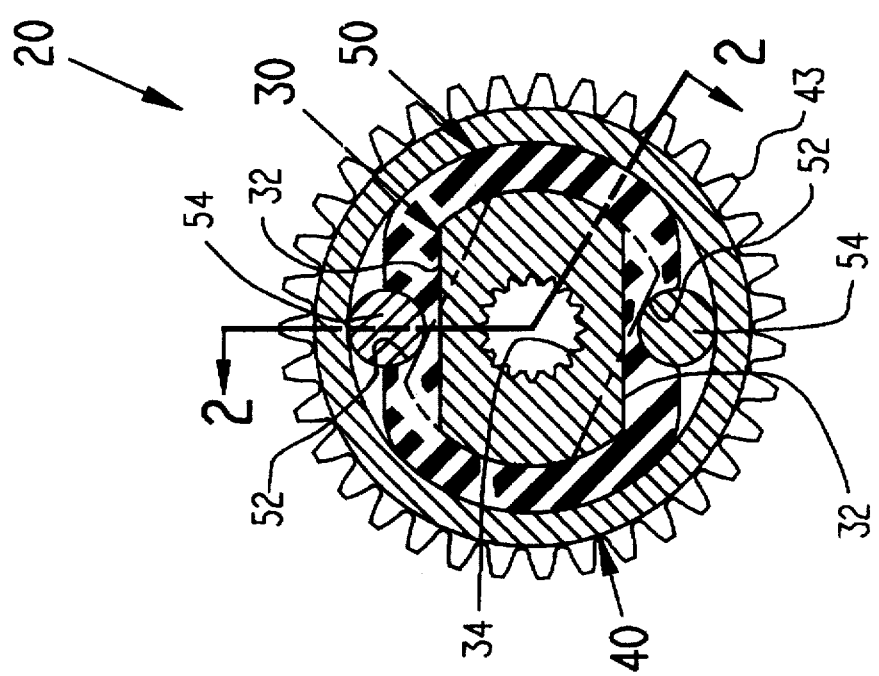

FAIL-SAFE SHEAR ELASTOMERIC COUPLING

BACKGROUND AND SUMMARY OF THE INVENTION

The present invention is directed to the field of elastomeric drive couplings. More particularly, this invention is directed to an elastomeric coupling that is fail-safed against possible loss of drive.

The present elastomeric coupling is design to replace a drive coupling for an alternator of an M-60 tank. The existing part is used to couple an AVDS-1790-2C diesel engine to an off-cooled alternator which typically produces between 650 and 800 amps. The existing elastomeric coupling is designed to protect the splined input shaft of the alternator from possible breakage should the alternator lock-up. In that case, the elastomer of the existing coupling is sacrificed to preserve the integrity of the metal input shaft. Unfortunately, this effectively disables the tank, since without the alternator, the batteries will soon be exhausted.

The customer has determined that possible damage to the input shaft is the lesser of two evils as compared to disabling of the M-60 tank. Accordingly, at the customer's insistance, the existing coupling is to be replaced with a fail-safed coupling. A number of existing patents detail proposed fail-safe drive couplings; however, many are unduly complex and, therefore, not cost-competitive, while others are somewhat sprawling and will not fit within the defined space envelope to which this application is limited.

In the coupling of the present invention, a pair of longitudinally extending flat surfaces are formed on opposing sides of the inner, in this case, driven member. A pair of rigid pins are positioned in pockets created in the elastomer member that is bonded to at least one of the inner and outer members and the pins are staked to the end caps of the outer member's housing. The present design provides the isolation afforded by an elastomeric coupling for normal torque loads with relative angular displacement of the outer drive gear to the inner driven member that is connected to the splined input shaft being on the order of 5°–8°. Should the relative angular displacement significantly exceed the norm and reach an angle of say, around 25°, a condition that could only occur in the event of elastomer or bond failure, the pair of opposed flats on the inner member will effectively engage the pair of rigid, preferably steel, pins to ensure the transmission of drive torque. A layer of elastomer will snub metal-to-metal contact.

Various other features, advantages and characteristics of the present invention will become apparent after a reading of the following specification.

BRIEF DESCRIPTION OF THE DRAWINGS

At least one embodiment of the present invention is described in conjunction with the following figures in which FIG. 1 is a cross-sectional front view of a preferred embodiment of the elastomeric coupling of the present invention;

FIG. 2 is a cross-sectional side view of the FIG. 1 embodiment as seen along line 1—1;

FIG. 3b depicts a cross-sectional side view of the prior art coupling as seen along line 3b—3b of FIG. 3a.

DETAILED DESCRIPTION OF THE PREFERRED EMBODIMENTS

Figure 3B:
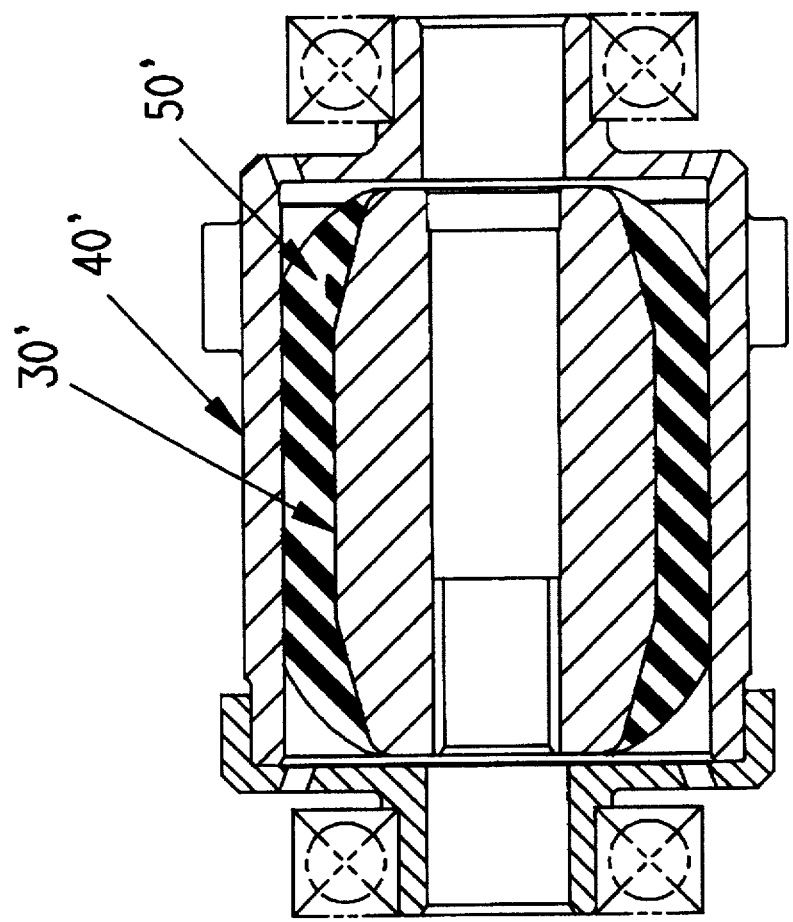
Figure 3A:
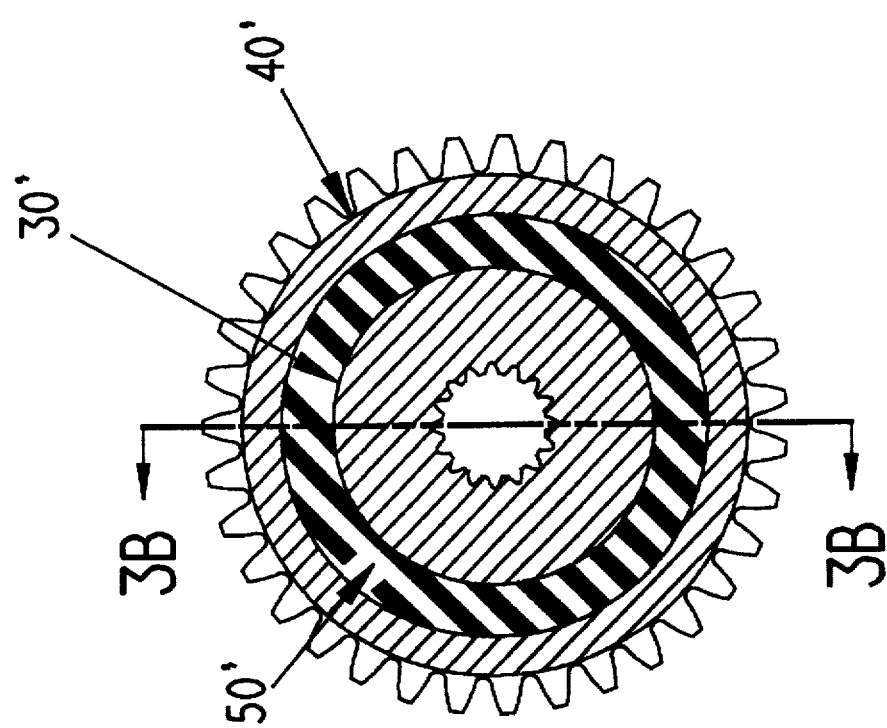
FIG. 3a depicts a view similar to FIG. 1 of the prior art coupling being replaced.

A first preferred embodiment of the present elastomeric coupling is shown in FIGS. 1 and 2 generally at 20. Coupling 20 has three principle components: a first inner metallic member 30, a second outer metallic member 40 and an intermediate elastomeric member 50. By comparing the preferred embodiment with the prior art coupling depicted in FIGS. 3a and 3b, it can be seen that while the prior art coupling has the same principle components 30', 40' and 50', there are significant differences.

First inner metallic member 30 has machined on opposing sides, longitudinally extending flat surfaces 32. Elastomeric member 50 has formed in portions adjacents the flat surfaces 32, pockets 52. Elastomeric member 50 is at least partially bonded to at least one of inner (30) and outer (40) members. Preferably, elastomeric member 50 is fully bonded to inner member 30 and is held in place with respect to outer member 40 by friction. The inner member 30 and bonded elastomeric member 50 are forced into housing 42 of outer metallic member 40 precompressing the elastomer by an amount between 5–10%. Alternatively, the elastomeric member 50 could be bonded to the inner (30) and outer (40) members over a substantial portion of its periphery.

One end of housing 42 is closed by an integral end cap 44 and the opposite end by a separable end cap 46 which is slid over the end of housing 42 and atached as by spot welding. Each of the end caps 44, 46 is formed with a stem 48 that will be received in a respective bearing 11. Housing 42 is formed with an external gear 43 that is driven by a fly wheel of a 12-cylinder diesel engine through an intermediate gear (not shown). Inner metallic member 30 has a spline 34 which receives a splined shaft of an alternator (not shown) that is driven by the fly wheel through coupling 20. It will be apparent that, although outer member 40 is attached to the drive element and inner member 30 is attached to the driven element, other applications could reverse the drive and driven elements (i.e., the coupling could transmit drive through the inner member 30 to the outer member 40).

Each pocket 52 receives a rigid pin 54. Pocket 52 is shaped in the elastomeric member 50 so that there is minimal compression of the elastomer by the pin 54. Ends 56 have counterbores 58 formed therein and after insertion in the pocket, the ends are staked as at 59 in openings 45 in end caps 44, 46 to retain pins 54 in pockets 52. In the preferred embodiment, elastomeric member 50 is press-fit into outer housing 42, having been bonded to inner member 30. Should the precompression of the elastomer by 6–10% be insufficient to prevent the inner member from turning relative to the outer member under normal torque loading, the force exerted by elastomeric member 50 on pins 54 will generally be sufficient to restore elastomeric member 50 to the normal at rest position when the coupling 20 is unloaded.

Normal torque loading, 1200 lb-in. will result in a deflection of the outer, in this case, drive member 40 deflecting 5°–8° with respect to the inner driven member 30. Should the outer member be torqued relative to the inner member by a predetermined angular amount, say about 25°, a condition that can only exist should the elastomer or its bond far, the flat 32 will effectively drive its respective pin 54 so that the drive is fail-safed. The elastomer of elastomeric member 50 will typically be selected from the silicone elastomer family for its high-temperature, corrosion-resistance with a hardness preferably in the range of between 50 and 80 durometer and most preferably, in the 65 to 75 durometer range. Such an elastomer will perform in the desired deflection range of 5°–8° for torque loads up to about 4500 lb-in. with failure typically occuring for loads exceeding this upper limit. Many snags that result in elastomer or bond failure will clear themselves prior to reaching the predetermined angular displacement (e.g., 25°). Further, the snubbing of the engagement of flats 32 with pins 54 by the intermediate elastomer will, in most cases, provide an acceptably smooth drive transition in case of elastomer or bond failure. Should the alternator or other driven member be locked up, however, this fail-safe coupling 20 could cause damage to the alternator drive train such as stripping of the splines on the driven shaft or the internal splines 34 of inner member 30.

Certain changes, alternatives and modifications of the present invention will become apparent to a person of ordinary skill in the art following a reading of the foregoing specification. It is intended that all such changes, alternatives and modifications that fall within the scope of the appended claims be considered part of the present invention.

What is claimed is:

1. A shear elastomeric drive coupling including a first inner metallic member connectable to a first one of a drive and a driven member, a second outer metallic member connectable to a second one of said drive and said driven members, an intermediate elastomeric member at least partially bonded to at least one of said inner and outer metallic members, said coupling being characterized by said inner metallic member having a pair of opposed generally longitudinally extending flat surfaces, said elastomeric member having a pair of pockets radially adjacent said opposed flat surfaces, each pocket receiving a rigid pin which is rigidly connected to said outer member such that said rigid pin is immovable relative to said outer member in any direction and rests in said pocket, whereby when said inner member turns with respect to said outer member through a predetermined angular amount, a portion of said respective flat surface will compress a portion of said elastomeric member to a point where there is cushioned contact between said flat surface and said pin such that said drive coupling is fail-safed against failure of said elastomeric member and its bond.

2. The drive coupling of claim 1 further characterized by said rigid pins being metal.

3. The drive coupling of claim 2 further characterized by each of said pins being secured in its respective pocket by staking opposing end portions to flare them outside a pair of end caps of a housing which forms a portion of said second metallic member and thereby secure said pins in position.

4. The drive coupling of claim 1 further characterized by said elastomeric member being bonded about at least a portion of each of its inner and outer peripheries to each of said inner and outer members, respectively.

5. The drive coupling of claim 1 further characterized by said predetermined angular amount being in the range of 20° to 30°.

6. The drive coupling of claim 5 further characterized by said predetermined angular amount being about 25°.

7. The drive coupling of claim of claim 6 further characterized by said elastomeric member being comprised of an elastomer of such a hardness that a normal relative rotation between the first and second metallic members is generally in a range of between 5° and 8° for drive torques in a range of about 1200 lb-in to about 4500 lb-in.

8. The drive coupling of claim 7 further characterized by said elastomer comprising a silicone elastomer.

9. The drive coupling of claim 8 further characterized by said silicone elastomer having a hardness in the range of between 50 and 80 durometer.

10. The drive coupling of claim 9 further characterized by said silicone elastomer having a durometer in the range of between 65 and 75 durometer.

11. A shear elastomeric drive coupling including a first inner metallic member connectable to a first one of a drive and a driven member, a second outer metallic member connectable to a second one of said drive and said driven members, an intermediate elastomeric member at least partially bonded to at least one of said inner and outer metallic members, said coupling being characterized by said inner metallic member having a pair of opposed generally longitudinally extending flat surfaces, said elastomeric member having a pair of pockets adjacent said opposed flat surfaces, each pocket receiving a rigid pin which is rigidly connected to said outer member by staking an end portion such that said rigid pin is immovable relative to said outer member in any direction and rests in said pocket, whereby when said inner member turns with respect to said outer member through a predetermined angular amount, a portion of said respective flat surface will compress a portion of said elastomeric member to a point where there is cushioned contact between said flat surface and said pin such that said drive coupling is fail-safed against failure of said elastomeric member and its bond.

* * * * *